(12) United States Patent
Schiavo, Jr.

(10) Patent No.: US 6,318,924 B1
(45) Date of Patent: Nov. 20, 2001

(54) QUICK-CONNECT FOR MOUNTING OBJECTS

(75) Inventor: Anthony Paul Schiavo, Jr., 1750 Kelly St., San Mateo, CA (US) 94403

(73) Assignee: Anthony Paul Schiavo, Jr., San Mateo, CA (US)

( * ) Notice: Subject to any disclaimer, the term of this patent is extended or adjusted under 35 U.S.C. 154(b) by 0 days.

(21) Appl. No.: 09/557,922

(22) Filed: Apr. 20, 2000

(51) Int. Cl.$^7$ .................................................. F16B 27/00
(52) U.S. Cl. ......................... 403/299; 403/343; 411/388
(58) Field of Search ............................... 403/408.1, 342, 403/343, 24, 299; 411/388, 389, 378, 396, 546, 397, 373, 374; 293/105; 180/219; 280/152.2, 152.1, 160.1

(56) References Cited

U.S. PATENT DOCUMENTS

| | | | |
|---|---|---|---|
| 159,390 | * | 2/1875 | Came .............................. 411/396 X |
| 824,983 | * | 7/1906 | Farrington ........................ 411/397 X |
| 937,577 | * | 10/1909 | Crump ................................. 411/384 |
| 1,814,966 | * | 7/1931 | Rosenberg ........................... 411/378 |
| 2,363,665 | * | 11/1944 | George ................................ 411/373 |
| 3,563,131 | * | 2/1971 | Ridley, Sr. ........................... 411/384 |
| 6,116,942 | * | 9/2000 | Chen et al. .......................... 439/362 |

* cited by examiner

Primary Examiner—Harry C. Kim
(74) Attorney, Agent, or Firm—Anthony Paul Schiavo, Jr.

(57) ABSTRACT

A method and apparatus for mounting objects to other objects is provided to enable easy installation and removal of accessories, such as saddlebags, to a motorcycle. The apparatus enables accessories to be installed and removed quickly and easily in the minimum amount of time with the minimum amount of tools by providing a mounting recess in a bolt and engaging a second bolt therein to mount the accessory.

18 Claims, 1 Drawing Sheet

```
ITEM 1:  .375-16 LOCKING HEX NUT SST
ITEM 2:  .375 FLAT WASHER SST
ITEM 3:  .375 LOCK WASHER SST
ITEM 4:  .375-16 X 1.25 SOCKET HEAD BOLT
         W/.250-20 TAPPED HOLE SST
ITEM 5:  .250 LOCK WASHER SST
ITEM 6:  .250-20 MALE / FEMALE STANDOFF SST
ITEM 7:  .250 FLAT WASHER SST
ITEM 8:  .250 LOCK WASHER SST
ITEM 9:  .250-20 X 1.00 SOCKET HEAD BOLT SST
ITEM 10: COSMETIC BUTTON
```

ITEM 1: .375-16 LOCKING HEX NUT SST
ITEM 2: .375 FLAT WASHER SST
ITEM 3: .375 LOCK WASHER SST
ITEM 4: .375-16 X 1.25 SOCKET HEAD BOLT
       W/.250-20 TAPPED HOLE SST
ITEM 5: .250 LOCK WASHER SST
ITEM 6: .250-20 MALE / FEMALE STANDOFF SST
ITEM 7: .250 FLAT WASHER SST
ITEM 8: .250 LOCK WASHER SST
ITEM 9: .250-20 X 1.00 SOCKET HEAD BOLT SST
ITEM 10: COSMETIC BUTTON

QUICK-CONNECT FOR MOUNTING OBJECTS

FIELD OF THE INVENTION

The present invention relates to quick and easy attachment of objects, such as accessories, to other objects, such as a motorcycle.

BACKGROUND OF THE RELATED ART

The attachment of accessories, such as saddlebags to a motorcycle has always been difficult and time consuming. In most cases once accessories are attached to the motorcycle they are left in place on the motorcycle because of the difficulty associated with removing the accessory.

Currently, to attach an accessory to a motorcycle, one must remove the bolts and nuts from the fender completely in order to attach or remove the saddlebags from the motorcycle. This potentially causes problems such as increasing the likelihood that the paint on the motorcycle could be scratched when removing these bolts. Additionally, the area available for one to access the bolts is limited and can pose problems for weekend mechanics who attempt to attach accessories. The weekend mechanic or enthusiast may not own the tools necessary to accomplish the more advanced task of removing the fender. As an example, a person having big hands would find it difficult to reach between the backside of the fender and the rear tire to reach the nut. This way would also require more tools which the agverge person may not have.

An alternative to this problem may be the use of snaps to attach the accessories. Snaps have problems in that the snaps can vibrate lose having the accessories fall from the motorcycle at any time. Also through continues use the snaps can cause the male portion of the snaps to enlarge under weight of use thereby decreasing their ability to hold the accessory. Snaps also do not have a lot of holding force compared to a nut and bolt type setup and can rust if not made from the correct material.

Therefore there remains a need for a quick and easy device or set-up to attach objects such as accessories to other objects, such as the installation and removal of saddlebags on a motorcycle.

SUMMARY OF THE INVENTION

The present invention provides a solution for quick installation and removal of the accessories, such as saddlebags, on a motorcycle. A nut and bolt assembly is provided which includes a bolt having a threaded recess in its head portion to receive an additional bolt therein which can mount the accessory. By installing this hardware assembly to a motorcycle, the accessories can be installed and removed easily and with in a short period of time.

BRIEF DESCRIPTION OF THE DRAWINGS

So that the matter in which the above recited features, advantages and objects of the present invention are attained and can be understood in detail, a more particular description of the invention, briefly summarized above, may be had by reference to the embodiments thereof which are illustrated in the appended drawings.

The appended drawings illustrate typical embodiments of this invention and are not to be considered limiting of its scope, for the invention may admit to other equally effective embodiments.

DETAILED DESCRIPTION OF THE INVENTION

Figure 1:
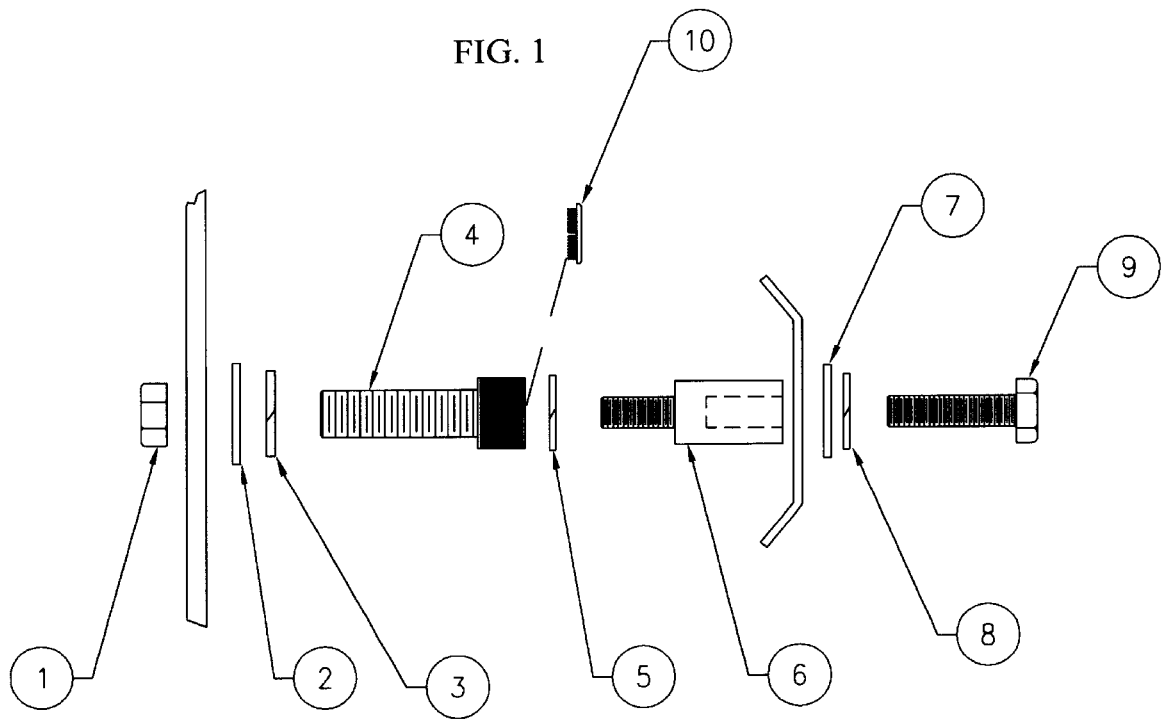
FIG. 1 is an assembly drawing showing one embodiment of a quick-connect hardware assembly of the present invention.

The present invention provides a way of installing and removing accessories quickly from an object such as a motorcycle. The assembly 10 is shown in FIG. 1 and includes a stainless steel flat washer 2, stainless steel lock washer 3 and a stainless steel socket head bolt 4 with internal threads which is used to attach the accessory to the motorcycle. The stainless steel socket head bolt 4 is installed into the fender 10 and fender strut 11 from the outside along with the stainless steel locking nut 1 to be installed from the backside of the motorcycle fender. The stainless steel locking nut 1 and the stainless steel socket head bolt 4 will take the place of the stock fender mounting bolts and will remain in the motorcycle fender so they can be used to mount the accessories when ever the need arises.

Once the bolts are installed a polished stainless steel standoff 6 with external and internal threads and a stainless steel lock washer 5 are installed into the internal threaded stainless steel socket head bolt 4. The accessory mounting bracket is installed into the two standoffs 6 and a foot peg mount if necessary.

After the accessory mounting bracket 12 is properly positioned, a stainless steel flat washer 7, a stainless steel lock washer 8 and a long stainless steel socket head bolt 9 and positioned through the mounting bracket 12 and engaged into the standoff 6 or the stainless steel socket head bolt 4.

To remove the accessory from the motorcycle, the steps are reversed to remove the lock washer 5, the standoff 6, the flat washer 7, the lock washer 8 and the head bolt 9 from the stainless steel socket head bolt 4 to remove the accessory mounting bracket 12, leaving the locking nut 1, the flat and lock washer 2, 3 and the stainless steel socket head bolt 4 installed in the motorcycle fender and strut 10, 11. This method of attachment to the motorcycle enhance the appearance of the mounted accessories because of the fact that all parts are stainless steel and will not rust and give the strength and appearance of a fastener which will not fail. A tab can be positioned into the open end of the recess formed in the stainless steel socket head bolt 4 to enhances the appearance when the assembly is not used to mount an accessory.

While the foregoing is directed to a preferred embodiment of the present invention, other and further embodiments of the invention may be devised without departing from the basic scope thereof, and the scope is determined by the claims which follow. Additionally, the above described invention has been illustrated in reference to a preferred use with accessories on motorcycles. However, the scope of the invention is not limited to this application.

What is claimed is:

1. A kit for mounting an accessory assembly to a motorcycle, said kit comprising:
   a first bolt having a head with a threaded recess therein and means for securing to the motorcycle;
   a second bolt having a head with a threaded recess therein and a threaded portion for engaging the threaded recess of the first bolt; and
   a third bolt having a head and a threaded portion for engaging the threaded recess of the second bolt to retain the accessory assembly between the second bolt and the third bolt.

2. The kit according to claim 1, wherein said means for securing comprises a threaded portion on the first bolt.

3. The kit according to claim 2, wherein said means for securing further comprises a nut for engaging the threaded portion on the first bolt.

4. The kit according to claim 1, wherein said means for securing further comprises a flat washer and a lock washer adapted to be disposed between the first bolt and the motorcycle.

5. The kit according to claim 1, wherein the first bolt comprises a stainless steel socket head bolt.

6. The kit according to claim 1, wherein the second bolt comprises a polished stainless steel standoff.

7. The kit according to claim 1, wherein the kit further comprises a lock washer adapted to be disposed between the first bolt and the second bolt.

8. The kit according to claim 1, wherein the kit further comprises a flat washer and a lock washer adapted to be disposed between the third bolt and the accessory assembly.

9. The kit according to claim 1, wherein the kit further comprises at least one cosmetic button adapted to engage the threaded recess of the first bolt when the second bolt is not engaged therein.

10. A method for mounting an accessory assembly to a motorcycle, said method comprising the steps of:

removing a fender mounting bolt from the motorcycle;

securing a first bolt having a head with a threaded recess onto the motorcycle to replace the fender mounting bolt;

securing a second bolt having a head with a threaded recess and a threaded portion onto the threaded recess of the first bolt;

aligning the accessory assembly onto the second bolt; and securing a third bolt having a head and a threaded portion onto the threaded recess of the second bolt to retain the accessory assembly between the second bolt and the third bolt.

11. The method according to claim 10, wherein said first bolt is provided with a threaded portion.

12. The method kit according to claim 11, further comprising the step of providing a nut for engaging the threaded portion on the first bolt.

13. The method according to claim 10, further comprising the step of providing a flat washer and a lock washer between the first bolt and the motorcycle.

14. The method according to claim 10, wherein the first bolt comprises a stainless steel socket head bolt.

15. The method according to claim 10, wherein the second bolt comprises a polished stainless steel standoff.

16. The method according to claim 10, further comprising the step of providing a lock washer between the first bolt and the second bolt.

17. The method according to claim 10, further comprising the step of providing a flat washer and a lock washer between the third bolt and the accessory assembly.

18. The method according to claim 10, further comprising the step of providing at least one cosmetic button adapted to engage the threaded recess of the first bolt when the second bolt is not engaged therein.

* * * * *